(12) United States Patent
Ono et al.

(10) Patent No.: US 8,384,858 B2
(45) Date of Patent: Feb. 26, 2013

(54) LIQUID CRYSTAL DISPLAY DEVICE

(75) Inventors: Kikuo Ono, Mobara (JP); Kazumi Kanesaka, Chonan (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 156 days.

(21) Appl. No.: 12/938,532

(22) Filed: Nov. 3, 2010

(65) Prior Publication Data

US 2011/0109851 A1   May 12, 2011

(30) Foreign Application Priority Data

Nov. 6, 2009   (JP) .................................. 2009-255281

(51) Int. Cl.
*G02F 1/1335* (2006.01)
(52) U.S. Cl. ......... 349/106; 349/107; 349/108; 349/109
(58) Field of Classification Search .......................... None
See application file for complete search history.

(56) References Cited

U.S. PATENT DOCUMENTS

2007/0058115 A1* 3/2007 Utsumi et al. ................ 349/109
2010/0328588 A1* 12/2010 Segawa et al. ................ 349/106

FOREIGN PATENT DOCUMENTS

JP     11-295717     10/1999
JP     2007-033744   2/2007

* cited by examiner

*Primary Examiner* — Thanh-Nhan P Nguyen
(74) *Attorney, Agent, or Firm* — Antonelli, Terry, Stout & Kraus, LLP.

(57) ABSTRACT

A backlight source has a spectral distribution such that luminances of red and green light are stronger than luminance of blue light. A color filter includes a blue coloring layer that can best transmit a blue light, a red coloring layer that can best transmit a red light, a green coloring layer that can best transmit a green light, and a porous layer in which penetration holes are formed so as to penetrate therethrough in its thickness direction. The blue coloring layer is formed so as to be thicker than the red and green coloring layers. A liquid crystal layer is formed so as to be thinner in a portion facing the blue coloring layer than a portion facing the red and green coloring layers. The porous layer is formed from the same material and to have the same thickness as the blue coloring layer.

11 Claims, 6 Drawing Sheets

LIQUID CRYSTAL DISPLAY DEVICE

CROSS-REFERENCE TO RELATED APPLICATION

The present application claims priority from Japanese application JP2009-255281 filed on Nov. 6, 2009, the content of which is hereby incorporated by reference into this application.

BACKGROUND OF THE INVENTION

1. Field of the Invention

The present invention relates to a liquid crystal display device.

2. Description of the Related Art

JP 11-295717 A discloses a liquid crystal display device in which a transparent layer is formed in a color filter in addition to coloring layers of the three colors red, green, and blue so as to improve the luminance. However, there is a problem in that a step of forming the transparent layer is added. Thus, forming a light transmitting region where any of the coloring layers and the transparent layer are not present in the color filter may be considered. However, a recess is formed in that region because no layer is present. Thus, there is a problem in that the thickness of a liquid crystal layer increases, thus affecting the characteristics of a liquid crystal display panel.

In addition, JP 2007-33744 A discloses a technique in which in addition to the coloring layers of the three colors red, green, and blue, an island-shaped member is formed in a portion of the color filter, which is formed from the same material as the coloring layer of at least one color among the three colors.

According to the techniques disclosed in JP 11-295717 A and JP 2007-33744 A, it is possible to improve the luminance. However, the brightness perceived by the human eye is not necessarily identical to the luminance. Thus, it is desirable to improve the brightness perceived by the human eye.

SUMMARY OF THE INVENTION

The present invention aims to improve the brightness perceived by the human eye as well as the luminance.

(1) A liquid crystal display device according to the invention including: a first substrate; a color filter disposed on the first substrate; a second substrate; a liquid crystal layer disposed between the color filter and the second substrate; and a backlight source, wherein the color filter includes a first coloring layer that can best transmit a first color light, a second coloring layer that can best transmit a second color light, a third coloring layer that can best transmit a third color light, and a porous layer in which a plurality of penetration holes are formed so as to penetrate therethrough in the thickness direction thereof, and wherein the porous layer is formed from the same material as the third coloring layer. According to this invention, since the porous layer has a plurality of penetration holes, it is possible to suppress the attenuation of light passing through the porous layer and to improve the luminance. Since the porous layer is formed from the same material as the third coloring layer, although the luminance of the third color light in the backlight source is weaker than that of the first color light and the second color light, it is possible to increase the luminance of the third color light in the liquid crystal display device.

(2) In the liquid crystal display device according to (1), the colors of the first, second, and third color light may be red, green, and blue, respectively.

(3) In the liquid crystal display device according to (2), the third coloring layer may be formed so as to be thicker than the first coloring layer and the second coloring layer, the liquid crystal layer may be formed so as to be thinner in a portion facing the third coloring layer than a portion facing the first coloring layer and the second coloring layer, and the porous layer may be formed to have the same thickness as the third coloring layer. According to this configuration, since the porous layer has the same thickness as the third coloring layer, the thickness of the liquid crystal layer on the porous layer will not increase greatly. Moreover, since the third coloring layer is thicker than the first coloring layer and the second coloring layer, the liquid crystal layer becomes thin on the third coloring layer. Thus, the value of an application voltage necessary for maximizing the transmittance of the third color light in the normally black mode can be increased close to the value of an application voltage necessary for maximizing the transmittance of the green light. Accordingly, the value of the application voltage can be set based on the green light to which the human eye is best sensitive.

(4) In the liquid crystal display device according to (1), the colors of the first, second, and third color light may be blue, green, and red, respectively.

(5) In the liquid crystal display device according to any one of (1) to (4), the color filter may further include a fourth coloring layer that can best transmit a fourth color light, and the color of the fourth color light may be cyan or yellow.

(6) In the liquid crystal display device according to (1), the color filter may further include a fourth coloring layer that can best transmit a fourth color light, and the colors of the first, second, third, and fourth color light may be red, green, cyan or yellow, and blue, respectively.

(7) In the liquid crystal display device according to any one of (1) to (6), the plurality of penetration holes may penetrate through the porous layer only in the thickness direction thereof.

(8) In the liquid crystal display device according to any one of (1) to (7), the second coloring layer may be formed so as to be thinner than the first coloring layer.

DETAILED DESCRIPTION OF THE INVENTION

Hereinafter, the embodiment of the present invention will be described with reference to the drawings.

Figure 1:
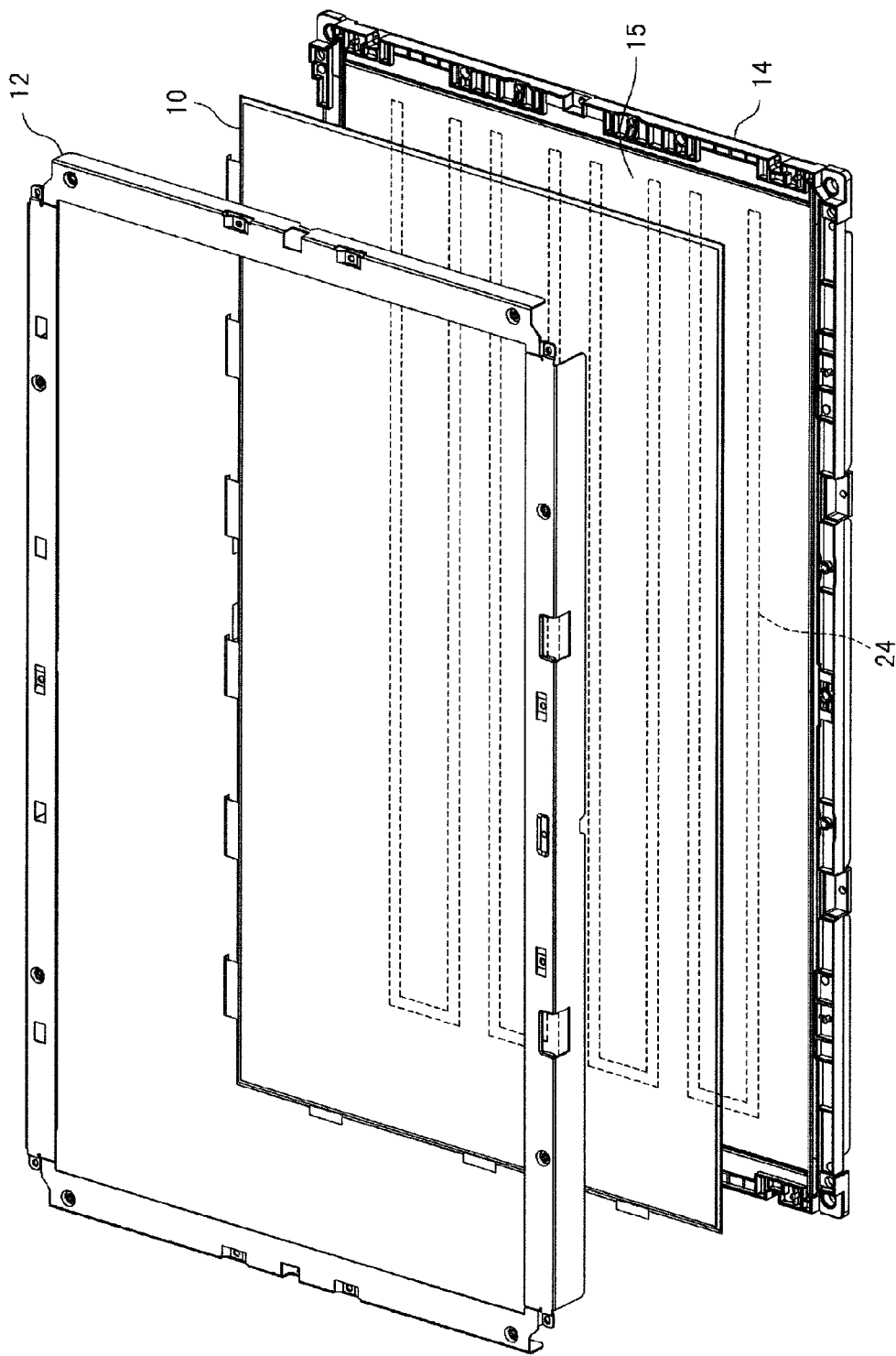
FIG. 1 is an exploded perspective view showing a liquid crystal display device according to an embodiment of the present invention.

FIG. 1 is an exploded perspective view showing a liquid crystal display device according to an embodiment of the present invention. The liquid crystal display device includes a liquid crystal display panel 10. The liquid crystal display panel 10 is supported by an upper frame 12 and a lower frame 14. A diffusion sheet 15 and a lower diffusion plate (not shown) are attached to the lower frame 14, and a backlight source (fluorescent tube) 24 is disposed under the lower frame 14. The backlight source 24 has a spectral distribution such that the luminance (visually perceived brightness) of a first color light (for example, red) and a second color light (for example, green) is stronger than the luminance of a third color light (for example, blue).

Figure 2:
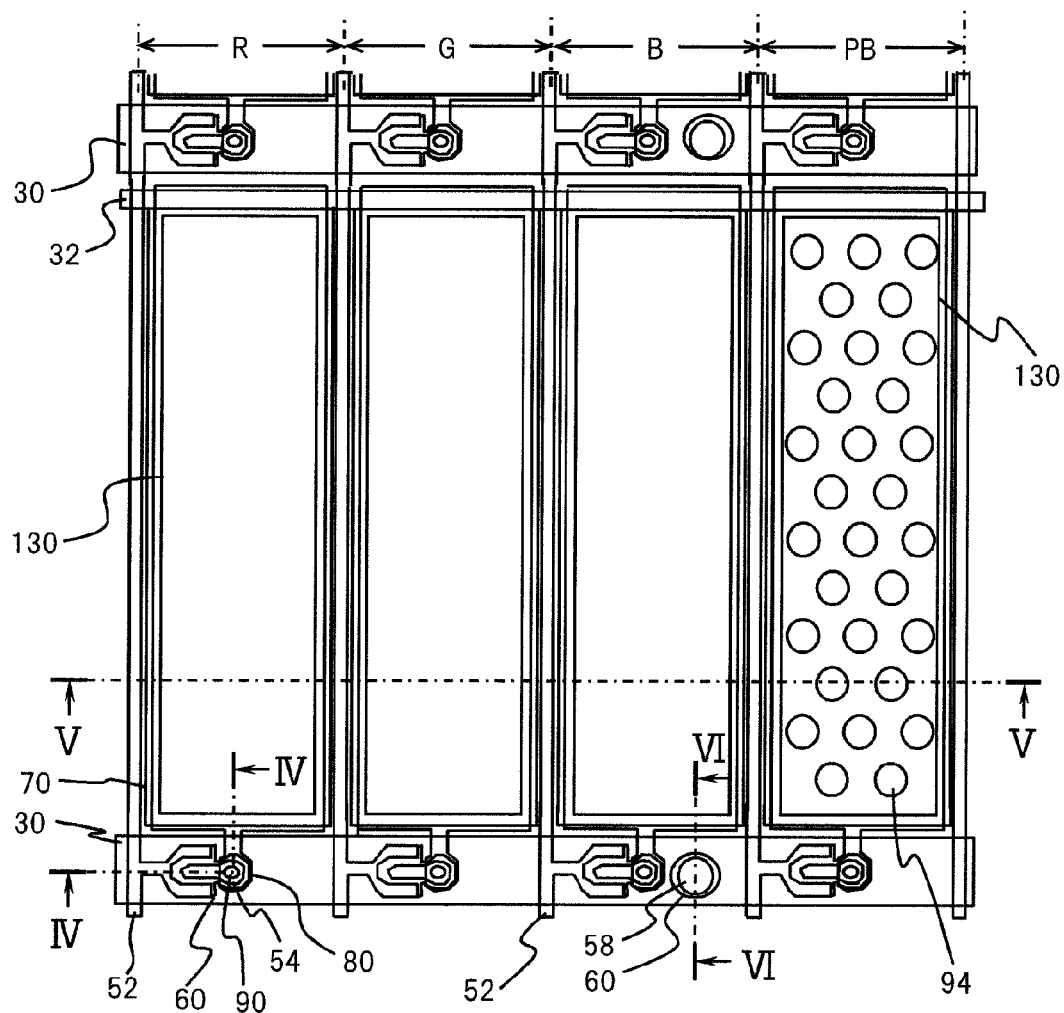
FIG. 2 is a plan view of a portion of a liquid crystal display panel shown in FIG. 1 corresponding to plural (four) subpixels which constitute one pixel.
Figure 4:
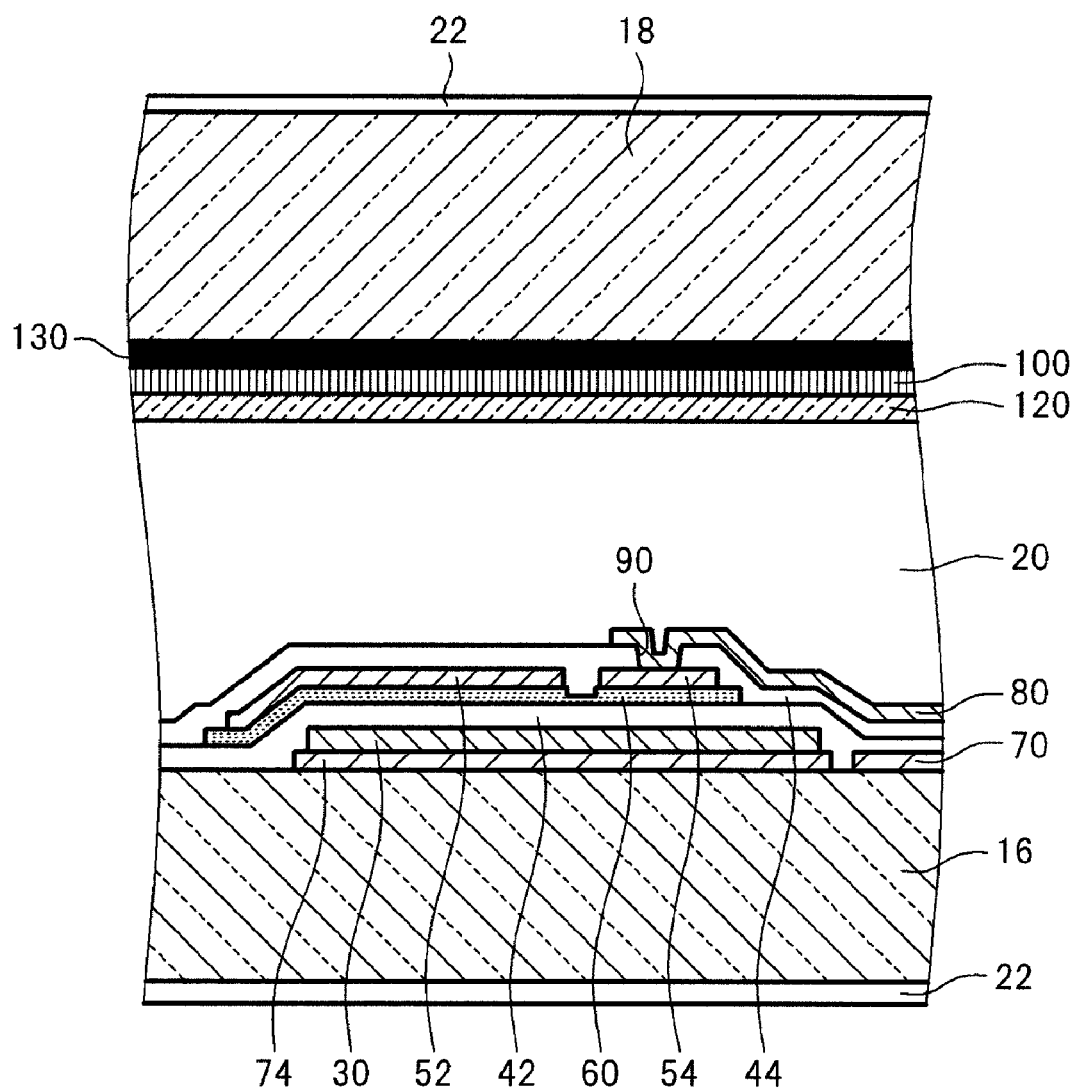
FIG. 4 is a sectional view of the liquid crystal display panel taken along the line IV-IV in FIG. 2.

FIG. 2 is a top view of a portion of the liquid crystal display panel 10 shown in FIG. 1 corresponding to plural (four) subpixels which constitute one pixel. FIG. 4 is a sectional view of the liquid crystal display panel 10 taken along the line IV-IV in FIG. 2.

As shown in FIG. 4, the liquid crystal display panel 10 includes a first substrate 16 and a second substrate 18. The first substrate 16 and the second substrate 18 are transparent substrates (for example, glass substrates). A liquid crystal layer 20 is disposed between the first substrate 16 and the second substrate 18. The first substrate 16 and the second substrate 18 each have a surface on the opposite side of the liquid crystal layer 20, to which a polarizing plate 22 is attached in a cross-Nicol state.

A thin-film transistor (TFT) is formed on a surface of the first substrate 16 facing the liquid crystal layer 20. The thin-film transistor is a switch for controlling the driving of the liquid crystal layer 20. The thin-film transistor is a bottom-gate type transistor in which a gate electrode 30 to which a scanning voltage for control is applied is disposed on the bottom side. The gate electrode 30 is formed on the first substrate 16. A conductive film that forms the gate electrode 30 and a first transparent conductive film are continuously formed, and both films are subjected to photo-etching in the TFT process. Thus, the gate electrode 30 is patterned, and the first transparent conductive film is divided into a base film 74 and a common electrode 70 which are stacked under the gate electrode 30. In the present embodiment, an IPS (In-Plane Switching)-mode liquid crystal display device is described. However, the liquid crystal display device according to the present invention can be applied to other driving modes such as VA (Vertical Alignment) mode.

A gate insulating film 42 made from inorganic material (semiconductor oxide such as $SiO_2$ or semiconductor nitride such as SiN) is formed by a plasma CVD process or the like so as to cover the gate electrode 30. A semiconductor layer 60 made from amorphous silicon or microcrystalline silicon is formed on the gate insulating film 42. A source electrode 54 to which a pixel potential is output and a drain electrode 52 to which a video signal is applied are formed on the semiconductor layer 60. A protective insulating layer 44 made from inorganic material (semiconductor oxide such as $SiO_2$ or semiconductor nitride such as SiN) is formed so as to cover the source electrode 54, the drain electrode 52, and the semiconductor layer 60. The humidity-associated contamination of the semiconductor layer 60 is prevented by the protective insulating layer 44.

An opening 90 is opened in the protective insulating layer 44 by photo-etching. On the protective insulating layer 44, a pixel electrode 80 is formed from a second transparent conductive film. The pixel electrode 80 is disposed above the common electrode 70 and processed so as to have a slit-shaped pattern in top view. The common electrode 70 and the pixel electrode 80 are formed from ITO (Indium Tin Oxide) or indium zinc oxide by a sputtering method or the like.

When a gate voltage is applied to the gate electrode 30, the resistance of the semiconductor layer 60 between the drain electrode 52 and the source electrode 54 to which a video signal voltage is applied decreases. As a result, an electric field is generated between the pixel electrode 80 which is connected to the source electrode 54 and the common electrode 70 to which a common voltage is applied. The electric field is applied to the liquid crystal layer 20, whereby the transmittance of the liquid crystal layer 20 is changed, and images are displayed.

A black matrix 130 is disposed on a surface, close to the liquid crystal layer 20, of the second substrate 18 which is disposed at a position facing the first substrate 16 with the liquid crystal layer 20 disposed therebetween. The black matrix 130 is formed from resin including black pigment and carbon. The black matrix 130 prevents light from moving towards a channel region of the semiconductor layer 60. Therefore, the top-view shape of the black matrix 130 is an island-like form or a stripe-like form.

In the second substrate 18, a color filter 100 is formed on a side of the black matrix 130 close to the liquid crystal layer 20.

On a surface of the second substrate 18 close to the liquid crystal layer 20, an overcoat film 120 made from organic material is formed so as to cover the surface thereof. The overcoat film 120 is formed from transparent material so as not to contain contaminants such as pigment which is ionized and dissolved into the liquid crystal layer 20. Since the overcoat film 120 is a coating film, when the color filters 100 have different thicknesses, the overcoat film 120 has an effect of eliminating differences in levels on the color filters 100. The thicker the overcoat film 120, the greater the planarizing effect.

In the liquid crystal display panel 10, when all the plural subpixels are ON, one pixel displays white of the maximum luminance. The four subpixels shown in FIG. 2 include a red pixel R, a green pixel G, a blue pixel B, and a light-blue pixel PB according to the color of the color filter 100.

In one subpixel, the gate electrode 30 and the drain electrode 52 extend in an intersecting direction. The semiconductor layer 60 which forms the TFT, the source electrode 54, and the opening 90 are formed on the gate electrode 30. Through the opening 90, the source electrode 54 and the pixel electrode 80 are connected. The pixel electrode 80 has a slit-like shape in the top view although not shown in detail in the figure. The liquid crystal layer 20 is driven by an electric field applied between the pixel electrode 80 and the common electrode 70.

The portions corresponding to the subpixels of each color have basically the same configuration, except for the following two differences. The first difference is that a pedestal electrode 58 of a cell gap spacer which determines the thickness of the liquid crystal layer 20 is formed on the gate electrode 30 of the blue pixel B as shown in FIG. 2. The second difference is that a plurality of penetration holes 94 are formed in the color filter so as to correspond to the light-blue pixel PB.

Figure 3:
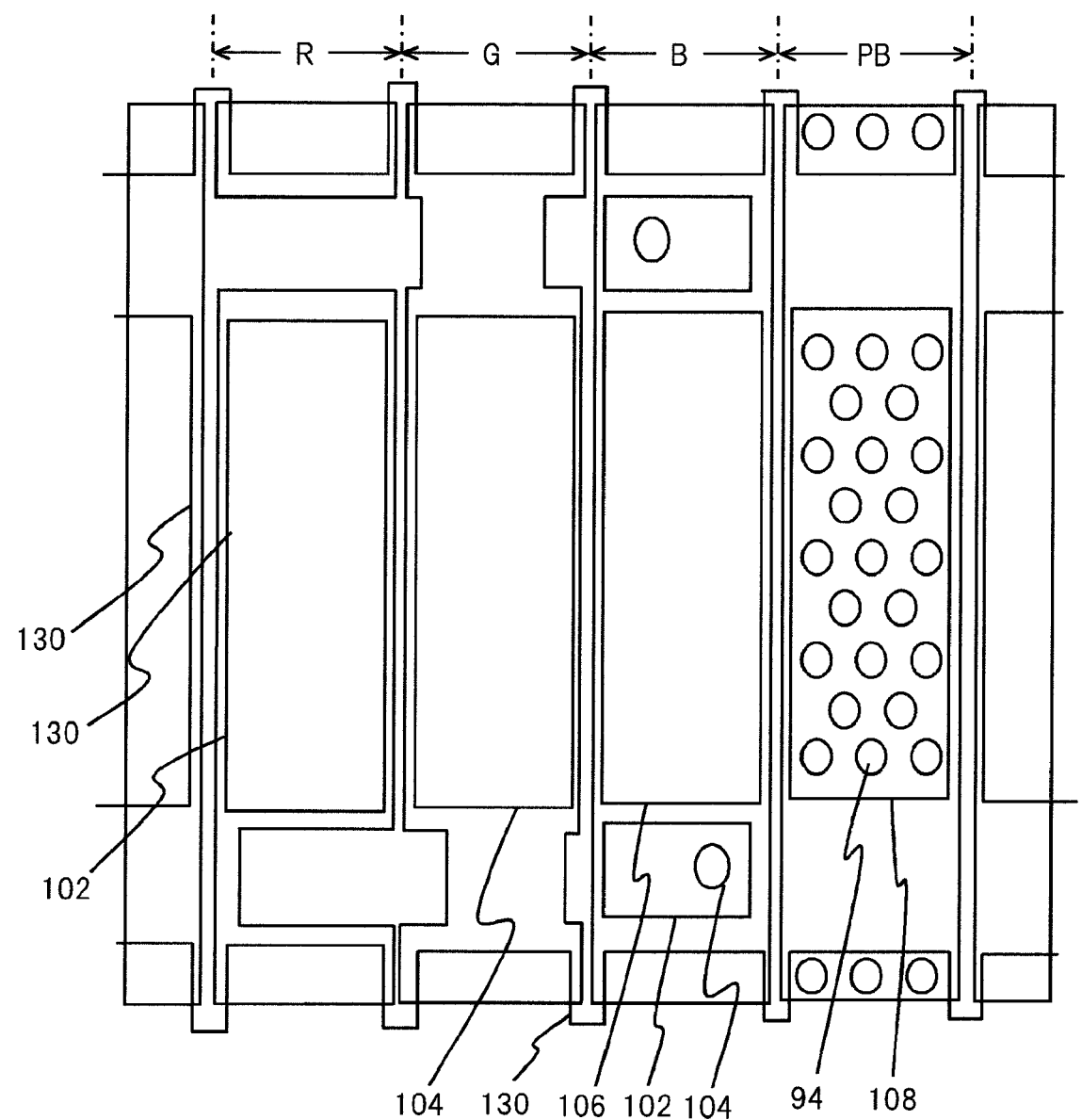
FIG. 3 is a plan view of a portion of a second substrate corresponding to plural (four) subpixels which constitute one pixel.

FIG. 3 is a top view of a portion of the second substrate 18 corresponding to plural (four) subpixels which constitute one pixel. The black matrix 130 is formed so as to partition the main light-transmitting portions of the subpixels.

A red coloring layer 102, a green coloring layer 104, and a blue coloring layer 106 are disposed in the red pixel R, the green pixel G, and the blue pixel B, respectively. The light-blue pixel PB is formed by patterning the blue coloring layer 106 similarly to the blue pixel B and forming a plurality of penetration holes 94 in the light-transmitting portion thereof.

In the present embodiment, a white color filter layer is not provided, and the light-blue pixel PB is formed in the step of forming other coloring layers during the processes of manufacturing the color filter 100. Although the white color filter layer is not used, since the organic overcoat film 120 buries the penetration holes 94, the flatness is improved.

Figure 5:
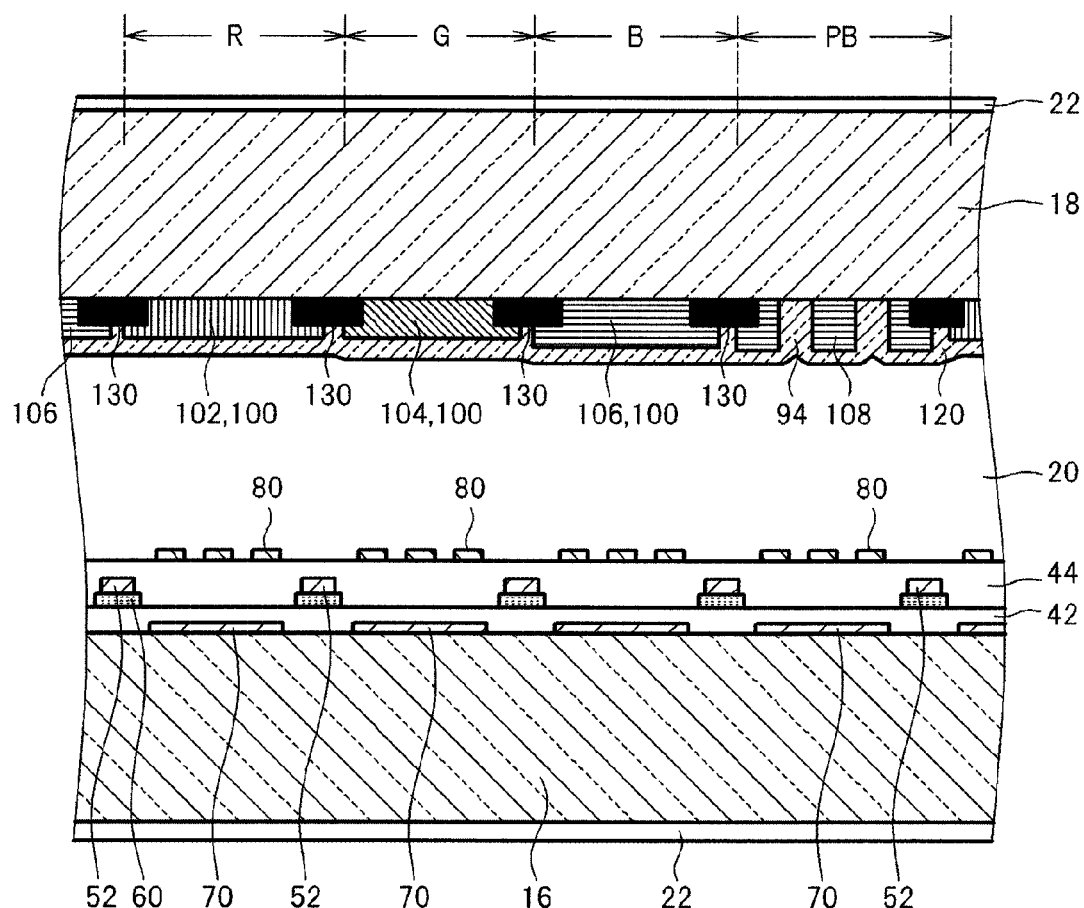
FIG. 5 is a sectional view of the liquid crystal display panel taken along the line V-V in FIG. 2.
Figure 6:
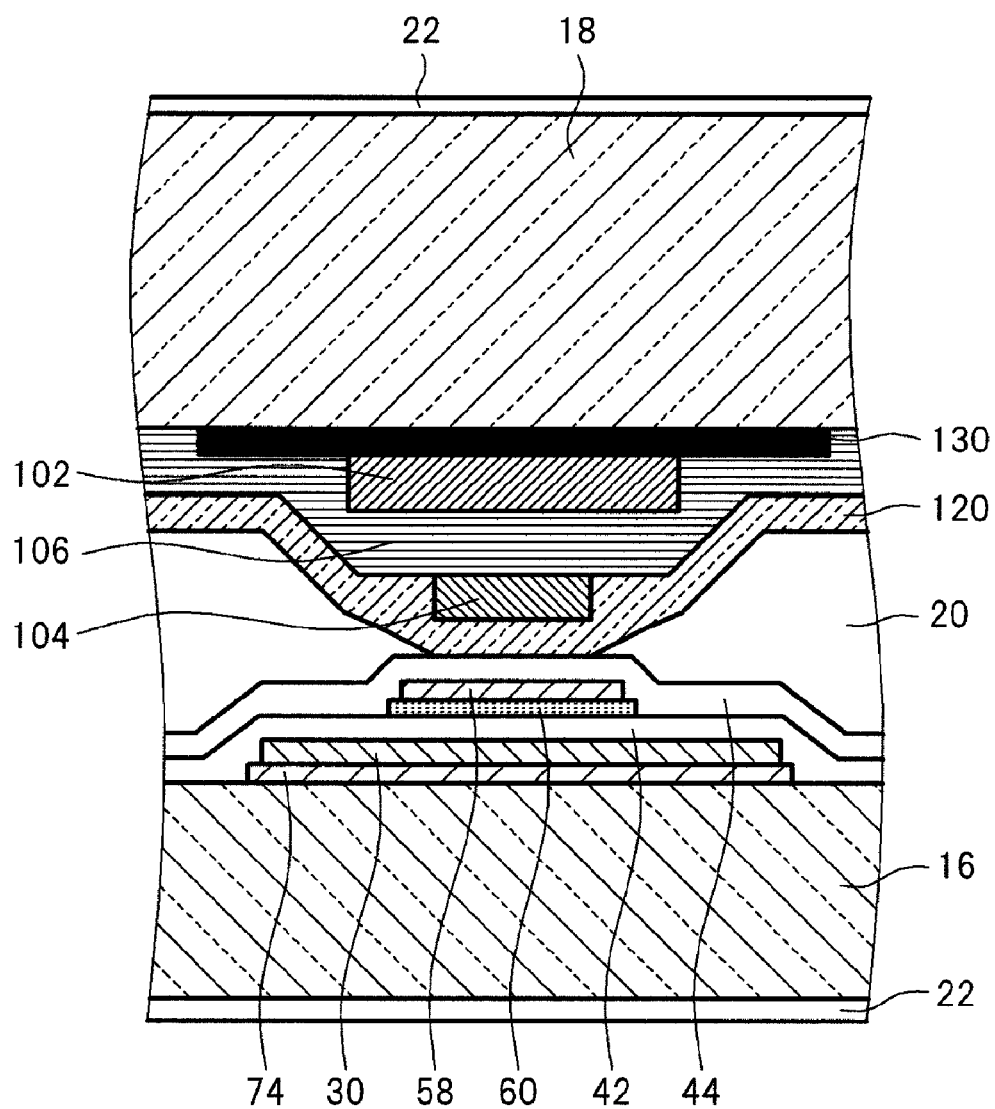
FIG. 6 is a sectional view of the liquid crystal display panel taken along the line VI-VI in FIG. 2.

FIG. 5 is a sectional view of the liquid crystal display panel taken along the line V-V in FIG. 2. FIG. 6 is a sectional view of the liquid crystal display panel taken along the line VI-VI in FIG. 2.

As shown in FIG. 6, in the blue pixel B, the red coloring layer 102, the blue coloring layer 106, and the green coloring layer 104 are stacked on the black matrix 130. The three layers have the role of a spacer that determines the cell gap which is the thickness of the liquid crystal layer 20. The region where the three layers are stacked overlaps with the pedestal electrode 58 on the gate electrode 30 of the blue pixel B in the top view pattern of FIG. 2.

As shown in FIG. 5, in a region that is interposed between the drain electrodes 52 neighboring the subpixels, the transparent common electrode 70 and the transparent pixel electrode 80 are formed on the first substrate 16 so as to interpose the gate insulating film 42 and the protective insulating layer 44. The electric field between the pixel electrode 80 and the common electrode 70 is applied to the liquid crystal layer 20, whereby the liquid crystal layer 20 is driven, and images are displayed.

The black matrix 130 is formed on a surface of the second substrate 18 close to the liquid crystal layer 20 at a position facing the drain electrode 52. The color filter 100 is formed on a principal surface of the second substrate 18 through which light is transmitted. The red coloring layer 102, the green coloring layer 104, and the blue coloring layer 106 are disposed in the red pixel R, the green pixel G, and the blue pixel B, respectively.

A porous layer 108 which is formed when forming the blue coloring layer 106 is disposed in the light-blue pixel PB. A plurality of penetration holes 94 are formed in the porous layer 108. The area ratio of the penetration holes 94 in the porous layer 108 is determined in accordance with the color coordinate of white of the maximum luminance which expresses the case where light passes through all of the red pixel R, the green pixel G, the blue pixel B, and the light-blue pixel PB, and a target value expressing the maximum luminance. Since no coloring layer containing pigment is present in the penetration holes 94, there will be no decrease in the transmittance due to pigment. Therefore, the maximum luminance of white increases, which is the effect of the present invention.

However, if the diameter of the penetration holes 94 is increased, the overcoat film 120 made from organic material can be planarized only when it is made thick. If the overcoat film 120 cannot be planarized, a light leakage may occur in the vicinity of brims of the penetration holes 94 during black display, and the contrast ratio will decrease. There is another problem in that the liquid crystal layer 20 becomes thicker, the liquid crystal retardation may increase, and the transmittance may decrease. Therefore, in the present embodiment, the radius of the penetration holes 94 is decreased to the processable minimum line width, and the density of the holes is increased, whereby the transmittance of the porous layer 108 is improved.

As shown in FIG. 5, the blue coloring layer 106 is set so as to be thicker than the red coloring layer 102 and the green coloring layer 104. This is because in the VA (Vertical Alignment) and IPS (In-Plane Switching) modes which are the birefringence liquid crystal modes, the transmittance exhibits wavelength dependence. That is, since the wavelength of blue light is short, when the thickness of the liquid crystal layer 20 is set to be the same for the respective colors, the transmittance during white display decreases. Therefore, by setting the blue coloring layer 106 so as to be thick, it is possible to increase the transmittance. This structure is generally referred to as a multi-gap structure. When the overcoat film 120 made from organic material is used with such a multi-gap structure, it is not possible to set the overcoat film 120 so as to be thick. That is, if the overcoat film 120 is set so as to be thick, although the flatness of the porous layer 108 increases, the blue coloring layer 106 will become thick, and the thickness of the liquid crystal layer 20 will be planarized. Thus, the effect of the multi-gap structure cannot be obtained.

The thickness of the overcoat film 120 made from organic material is preferably set to a thickness such that contamination of the liquid crystal layer 20 by the pigment of the color filter 100 is suppressed as much as possible. In the porous layer 108, it is preferable to provide the penetration holes 94 with the minimum line width to a principal coloring layer (in the present embodiment, the blue coloring layer 106) so that the penetration holes 94 do not overlap with each other. In the related art, the color filter layer remains in an island-like shape. Compared with the related art, the present embodiment in which the penetration holes 94 are provided in a planar pattern is better able to realize the planarizing effect even when the overcoat film 120 is thin. That is, the multi-gap structure can be employed.

As shown in FIG. 6, the gate electrode 30 is formed on the first substrate 16, the base film 74 which is formed by the same process as the common electrode 70 is formed under the gate electrode 30. The semiconductor layer 60 and the pedestal electrode 58 are formed thereon with the gate insulating film 42 disposed therebetween. The pedestal electrode 58 is formed from an electrode material which is formed by the same process as the drain electrode 52.

The black matrix 130 is formed on a side of the second substrate 18 close to the liquid crystal layer 20, and the red coloring layer 102, the blue coloring layer 106, and the green coloring layer 104 are formed on the black matrix 130. The overcoat film 120 made from organic material is formed on the coloring layers.

As described above, in the present embodiment, in the liquid crystal display device having the color filter of the four color structure including the red pixel R, the green pixel G, the blue pixel B, and the light-blue pixel PB, the porous layer 108 of the light-blue pixel PB is patterned from the same material as the blue coloring layer 106. In this step, a plurality of penetration holes 94 are formed in accordance with processing rules of the minimum line width and the penetration holes 94 are formed so as not to overlap with each other in the light-transmitting region. By doing so, since the penetration holes 94 form regions where no pigment is present, the transmittance is improved, and the luminance of white when the liquid crystal display device displays images of the red pixel R, the green pixel G, and the blue pixel B is improved.

The differences in level over the penetration holes 94 in the porous layer 108 are eliminated by the overcoat film 120 made from organic material, and no light leakage due to any difference in level occurs during black display. The blue coloring layer 106 of the blue pixel B is thicker than the other coloring layers, namely the red coloring layer 102 and the green coloring layer 104. Therefore, the thickness of the liquid crystal layer 20 of the blue pixel B decreases, and the transmittance of the liquid crystal display device is further improved. Moreover, if the overcoat film 120 is formed so as to be thick, since the difference in the thicknesses of the planarized color filters 100 will decrease due to the planarization, the transmittance improving effect will be diminished.

Therefore, the thin overcoat film 120 is used, and the penetration holes 94 of the porous layer 108 are formed with the minimum line width.

As described above, since the manufacturing of the porous layer 108 ends at the same time as the step of processing the blue coloring layer 106 of the blue pixel B, the manufacturing time can be shortened by 25% compared with a case of forming the red coloring layer 102, the green coloring layer 104, the blue coloring layer 106, and the porous layer 108 separately. Thus, the manufacturing cost can be reduced.

In the present embodiment, the porous layer 108 is realized by forming a plurality of penetration holes 94 in a layer which is formed from the same material and at the same time as the blue coloring layer 106. In contrast, when the porous layer 108 is formed from the same material as the green coloring layer 104, since the transmittance of the green coloring layer 104 is three times higher than that of the blue coloring layer 106, white will be tinted with green when all the pixels are lit. In order to prevent this, it is necessary to decrease the amount of green phosphor coated on the inner wall of a lamp used for the backlight source 24 and increase the amount of blue phosphor. However, since the thickness of the phosphor of the lamp is constant, and the efficiency of the blue phosphor is low, the luminance of the liquid crystal display device will decrease due to this chromaticity adjustment.

In a liquid crystal display device used for televisions, the color temperature during white display is as high as 10000K or higher as compared with 6500K for monitors. That is, there is a strong demand to make white appear bluish. As in the present embodiment, when the porous layer 108 is formed with the blue coloring layer 106 used as a base, since it is possible to increase the amount of the green phosphor in the backlight source 24, the luminance of the liquid crystal display device can be further improved. When the liquid crystal display device having the color filter of the four color structure is used, the luminance improving effect can be increased by forming the penetration holes 94 having the minimum line width in the porous layer 108 as the light-blue pixel PB.

The color filter 100 includes a first coloring layer (the red coloring layer 102) which can best transmit a first color light (for example, red light), a second coloring layer (the green coloring layer 104) which can best transmit a second color light (for example, green light), and a third coloring layer (the blue coloring layer 106) which can best transmit a third color light (for example, blue light).

As shown in FIG. 5, the third coloring layer (the blue coloring layer 106) is formed so as to be thicker than the first coloring layer (the red coloring layer 102) and the second coloring layer (the green coloring layer 104). The second coloring layer (the green coloring layer 104) is formed so as to be thinner than the first coloring layer (the red coloring layer 102).

The color filter 100 includes the porous layer 108 in which a plurality of penetration holes 94 are formed so as to penetrate therethrough in the thickness direction thereof. The plurality of penetration holes 94 penetrate only in the thickness direction of the porous layer 108. The porous layer 108 is formed from the same material as the third coloring layer (the blue coloring layer 106).

According to the present embodiment, since the porous layer 108 has the plurality of penetration holes 94, it is possible to decrease the attenuation of light passing through the porous layer 108 and to improve the luminance. Since the porous layer 108 is formed from the same material as the third coloring layer (the blue coloring layer 106), although the luminance of the third color light (blue light) in the backlight source 24 is weaker than that of the first color light (red light) and the second color light (green light), it is possible to increase the luminance of the third color light (blue light) in the liquid crystal display device.

As shown in FIG. 5, the third coloring layer (the blue coloring layer 106) is formed so as to be thicker than the first coloring layer (the red coloring layer 102) and the second coloring layer (the green coloring layer 104). The liquid crystal layer 20 is formed so as to be thinner in a portion facing the third coloring layer (the blue coloring layer 106) than a portion facing the first coloring layer (the red coloring layer 102) and the second coloring layer (the green coloring layer 104). The porous layer 108 is formed to have the same thickness as the third coloring layer (the blue coloring layer 106).

According to the present embodiment, since the porous layer 108 has the same thickness as the third coloring layer (the blue coloring layer 106), the thickness of the liquid crystal layer 20 on the porous layer 108 will not increase greatly. Moreover, since the third coloring layer (the blue coloring layer 106) is thicker than the first coloring layer (the red coloring layer 102) and the second coloring layer (the green coloring layer 104), the liquid crystal layer 20 becomes thin on the third coloring layer (the blue coloring layer 106). Thus, the value of an application voltage necessary for maximizing the transmittance of the third color light (blue light) in the normally black mode can be increased close to the value of an application voltage necessary for maximizing the transmittance of the green light. Accordingly, the value of the application voltage can be set based on the green light to which the human eye is best sensitive.

[Modifications]

In the above-described embodiment, although the colors of the first, second, and third color light are red, green, and blue, respectively, the colors may be blue, green, and red, respectively. That is, as a layer that forms the porous layer 108, the same material as the red coloring layer 102 may be used. This is based on the following reasons. The red coloring layer 102 has a lower transmittance than the green coloring layer 104, and a change in the color coordinate is small during white display on the entire surface. On the other hand, in the liquid crystal display device for televisions, it is preferable that the screen appears bluish during white display, namely, the color temperature is high. However, during black display, it is preferable that the screen appears in a neutral color. In this respect, by forming the porous layer 108 from the layer which can best transmit the red light, it is possible to make the screen appear more like a neutral black than blue during black display.

In the above-described embodiment, the liquid crystal display device having the color filter of the four color structure in which the light-blue pixel PB is added to the red pixel R, the green pixel G, and the blue pixel B was described. However, this structure can be applied to the color filter of the five color structure in which the light-blue pixel PB is added to the red pixel R, the green pixel G, the blue pixel B, and the cyan (CN) pixel. That is, the color filter may be configured so as to include a fourth coloring layer that can best transmit a fourth color light, and the color of the fourth color light may be cyan (CN).

Since the transmittance of a coloring layer that can best transmit cyan (CN) is low, the porous layer 108 may be formed from the same material as the coloring layer. For example, the colors of the first, second, third, and fourth color light may be red, green, cyan, and blue, respectively. By doing so, the cost of a liquid crystal display device having the color filter of the five color structure can be reduced to be equivalent to that of the color filter of the four color structure. In the case of the five color structure, yellow (Y) may be used instead of cyan (CN).

The liquid crystal display device of the present embodiment further includes the configurations (for example, an alignment film) of the known liquid crystal display device, and detailed description thereof will be omitted.

The present invention is not limited to the embodiment described above but can be modified in various ways. For example, the configurations described in the embodiment can be substituted with substantially the same configurations, configurations capable of achieving the same operations and effects, or configurations capable of attaining the same object.

What is claimed is:

1. A liquid crystal display device comprising:
   a first substrate;
   a color filter disposed on the first substrate;
   a second substrate;
   a liquid crystal layer disposed between the color filter and the second substrate; and
   a backlight source,
   wherein the color filter includes a first coloring layer that can best transmit a first color light, a second coloring layer that can best transmit a second color light, a third coloring layer that can best transmit a third color light, and a porous layer in which a plurality of penetration holes are formed so as to penetrate therethrough in the thickness direction thereof, and
   wherein the porous layer is formed from the same material as the third coloring layer,
   wherein the colors of the first, second, and third color light are red, green, and blue, respectively,
   wherein the third coloring layer is formed so as to be thicker than the first coloring layer and the second coloring layer,
   wherein the liquid crystal layer is formed so as to be thinner in a portion facing the third coloring layer than a portion facing the first coloring layer and the second coloring layer, and
   wherein the porous layer is formed to have the same thickness as the third coloring layer.

2. The liquid crystal display device according to claim 1, wherein the plurality of penetration holes penetrate through the porous layer only in the thickness direction thereof.

3. The liquid crystal display device according to claim 1, wherein the second coloring layer is formed so as to be thinner than the first coloring layer.

4. The liquid crystal display device according to claim 1, wherein the backlight source has a spectral distribution such that the luminances of the first and second color light are stronger than the luminance of the third color light.

5. The liquid crystal display device according to claim 1, further comprising an overcoat film that eliminates difference in level on the porous layer.

6. A liquid crystal display device comprising:
   a first substrate;
   a color filter disposed on the first substrate;
   a second substrate;
   a liquid crystal layer disposed between the color filter and the second substrate; and
   a backlight source,
   wherein the color filter includes a first coloring layer that can best transmit a first color light, a second coloring layer that can best transmit a second color light, a third coloring layer that can best transmit a third color light, and a porous layer in which a plurality of penetration holes are formed so as to penetrate therethrough in the thickness direction thereof, and
   wherein the porous layer is formed from the same material as the third coloring layer,
   wherein the color filter further includes a fourth coloring layer that can best transmit a fourth color light, and
   wherein the color of the fourth color light is cyan or yellow.

7. The liquid crystal display device according to claim 6, wherein the plurality of penetration holes penetrate through the porous layer only in the thickness direction thereof.

8. The liquid crystal display device according to claim 6, further comprising an overcoat film that eliminates difference in level on the porous layer.

9. A liquid crystal display device comprising:
   a first substrate;
   a color filter disposed on the first substrate;
   a second substrate;
   a liquid crystal layer disposed between the color filter and the second substrate; and
   a backlight source,
   wherein the color filter includes a first coloring layer that can best transmit a first color light, a second coloring layer that can best transmit a second color light, a third coloring layer that can best transmit a third color light, and a porous layer in which a plurality of penetration holes are formed so as to penetrate therethrough in the thickness direction thereof, and
   wherein the porous layer is formed from the same material as the third coloring layer,
   wherein the color filter further includes a fourth coloring layer that can best transmit a fourth color light, and
   wherein the colors of the first, second, third, and fourth color light are red, green, cyan or yellow, and blue, respectively.

10. The liquid crystal display device according to claim 9, wherein the plurality of penetration holes penetrate through the porous layer only in the thickness direction thereof.

11. The liquid crystal display device according to claim 9, further comprising an overcoat film that eliminates difference in level on the porous layer.

* * * * *